United States Patent
Sager

(10) Patent No.: US 6,473,742 B1
(45) Date of Patent: Oct. 29, 2002

(54) RECEPTION APPARATUS FOR AUTHENTICATED ACCESS TO CODED BROADCAST SIGNALS

(75) Inventor: John C Sager, Woodbridge (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/043,643
(22) PCT Filed: Feb. 14, 1997
(86) PCT No.: PCT/GB97/00431
§ 371 (c)(1),
(2), (4) Date: Mar. 25, 1998
(87) PCT Pub. No.: WO97/30534
PCT Pub. Date: Aug. 21, 1997

(30) Foreign Application Priority Data

Feb. 16, 1996 (GB) ............................................. 9603263

(51) Int. Cl.$^7$ .............................. H04N 7/16; H04N 7/00
(52) U.S. Cl. ........................... 705/51; 380/20; 380/6; 380/19; 380/23; 380/25; 348/732; 348/231; 348/233; 348/1; 348/10; 348/12; 455/2; 455/4.2; 455/5.1
(58) Field of Search ................ 705/1, 51; 348/732, 348/1, 5, 10, 12, 231, 233; 380/20, 19, 6, 23, 25; 455/2, 5.1, 4.2

(56) References Cited

U.S. PATENT DOCUMENTS

| | | | | |
|---|---|---|---|---|
| 4,430,669 A | * | 2/1984 | Cheung | 348/732 |
| 5,367,571 A | | 11/1994 | Bowen et al. | |
| 5,758,257 A | * | 5/1998 | Herz et al. | 348/1 |
| 5,828,402 A | * | 10/1998 | Collings | 348/5 |
| 5,953,418 A | * | 9/1999 | Bock et al. | 380/20 |
| 5,978,012 A | * | 11/1999 | Ozawa et al. | 348/10 |
| 5,999,224 A | * | 12/1999 | Maeda et al. | 348/12 |
| 6,005,561 A | * | 12/1999 | Hawkins et al. | 348/10 |
| 6,005,937 A | * | 12/1999 | Lee | 380/10 |
| 6,006,256 A | * | 12/1999 | Zdepski et al. | 348/12 |

OTHER PUBLICATIONS

Giachetti et al, "A Common Conditional Access Interface for Digital Video Broadcasting Decoders", IEEE Transactions on Consumer Electronics, vol. 41, No. 3, New York, US, pp. 836–841, XP000539543.

* cited by examiner

Primary Examiner—James P. Trammell
Assistant Examiner—Nga B. Nguyen
(74) Attorney, Agent, or Firm—Nixon & Vanderhye P.C.

(57) ABSTRACT

Decoding of a broadcast signal is enabled only if it carries an identifier verified by its presence (or absence) in a stored list. The list is loaded from a removable module. Preferably the loading of the list is conditional upon the success of a cryptographically authenticated exchange of signals between the module and the main part of the receiver.

16 Claims, 6 Drawing Sheets

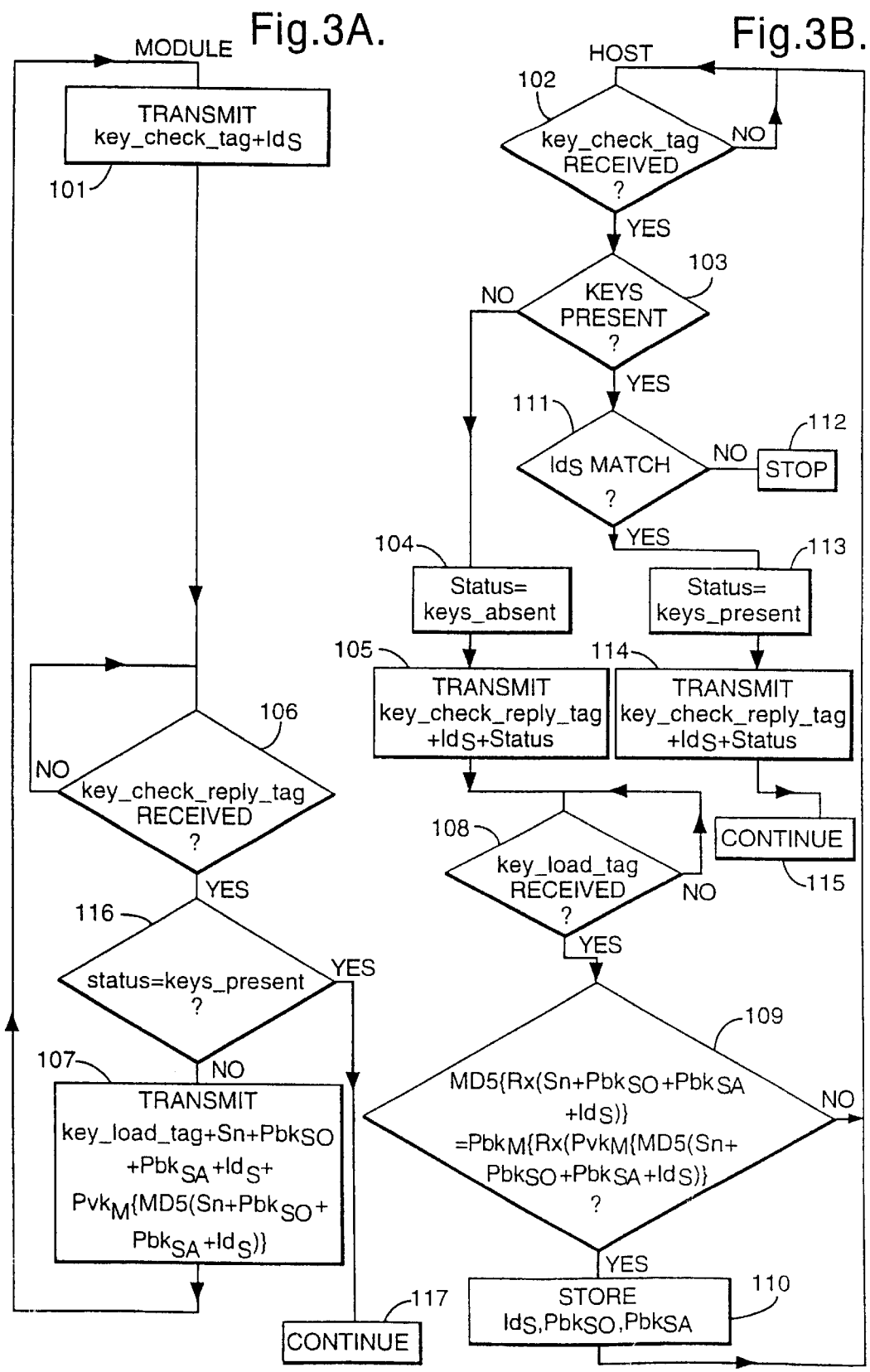

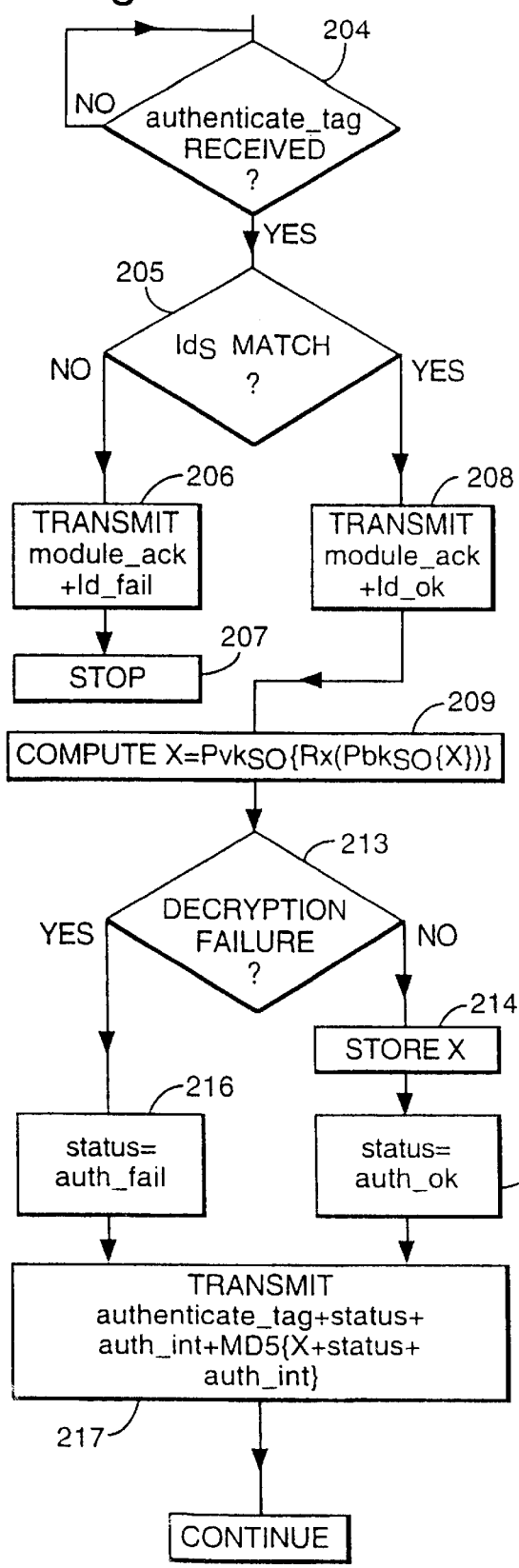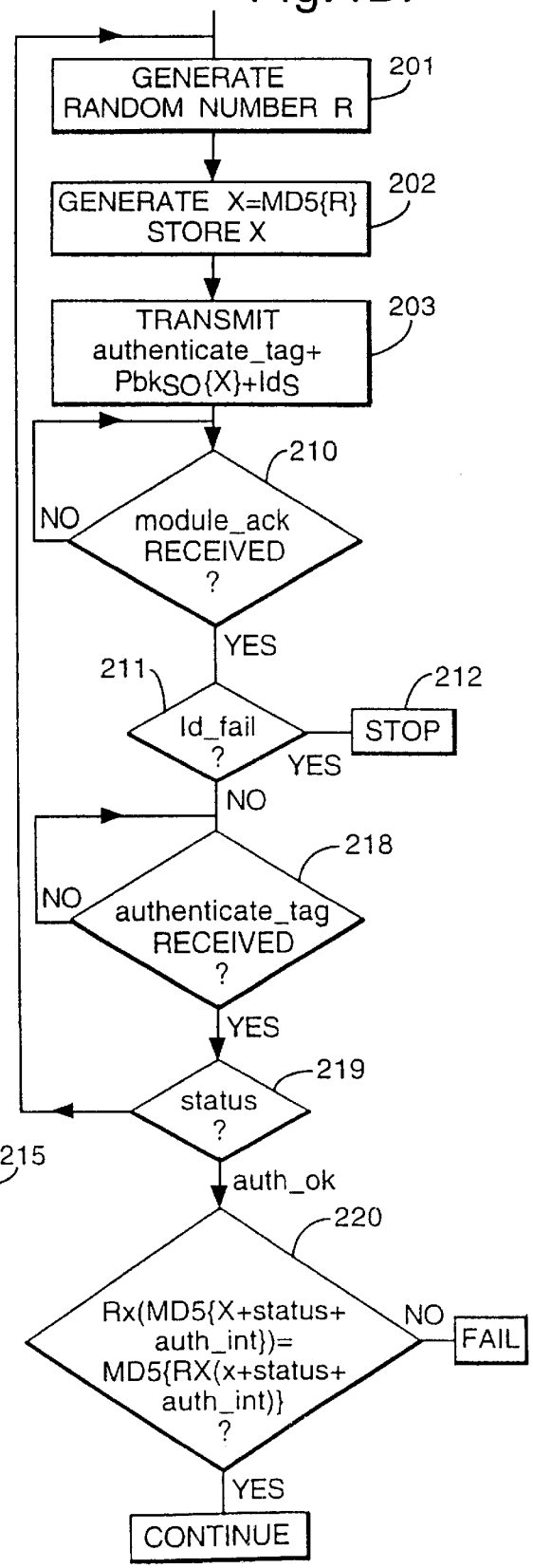

Fig.6.

| Transmission | Module | Receiver | |
|---|---|---|---|
| Release Mechanism | | | |
| Message=Sequence Number+Release Command+Time Stamp+Time Tolerance | | | |
| Send> Message+ PvkSA{MD5 {Message}} | If sequence number less than or equal to latest stored sequence number, take no action. Otherwise, store the new sequence number and forward the message + signature. | >Receive Message+PvkSA{MD5{Message}} | |
| | Send> MD5{X+Message} | Compare MD5{X+Rx(Message)} with Rx(MD5{X+Message}) | |
| | | Equal? | |
| | | Yes | No |
| | | Continue | Stop |
| | | Compare MD5{Rx(Message)} with PbkSA{Rx(PvkSA{MD5{Message}})} | |
| | | Equal? | |
| | | Yes | No |
| | | Continue | Stop |
| | | Compare current time with time stamp and tolerance | |
| | | Within Range ? | |
| | | Yes | No |
| | | Release | Stop |

RECEPTION APPARATUS FOR AUTHENTICATED ACCESS TO CODED BROADCAST SIGNALS

BACKGROUND OF THE INVENTION

FIELD OF THE INVENTION

The present invention is concerned with the control of reception apparatus and especially in situations where transmission include an identifier identifying the origin of the transmission. For example, a broadcast television transmission may contain a coded identifier which identifies the particular broadcast television service.

SUMMARY OF THE INVENTION

According to the present invention, there is provided an apparatus for receiving broadcast transmissions, which transmissions contain identifiers identifying the origin of the transmission, the apparatus including:

- a store for storing data identifying transmissions which the apparatus is or is not permitted to receive;
- means for loading the store with such data; and
- means for comparing received identifiers with the contents of the store and to enable or disable in dependence on the result of the comparison; wherein the apparatus has a fixed part and a removable part, the removable part containing a further store containing the said data and the loading means being operable to transfer the contents of the further store into the first-mentioned store.

"Broadcast" in this context may refer to transmissions sent by radio, but the invention could also be applied to other forms of distribution such as optical fibre networks or cables (as used for cable television for example). Each transmission could be on a different frequency; alternatively, a time division multiplex system might be used, with several transmissions (each with its own identifier) carried in a single multiplex signal, or a combination of frequency-division and time-division multiplexing might be employed.

Other aspects of the invention are set out in the subclaims.

BRIEF DESCRIPTION OF THE DRAWINGS

Some embodiments of the invention will now be described, by way of example, in which:

FIGS. 2 to 6 are flowcharts describing its operation.

DETAILED DESCRIPTION OF EXEMPLARY EMBODIMENTS

Figure 1:
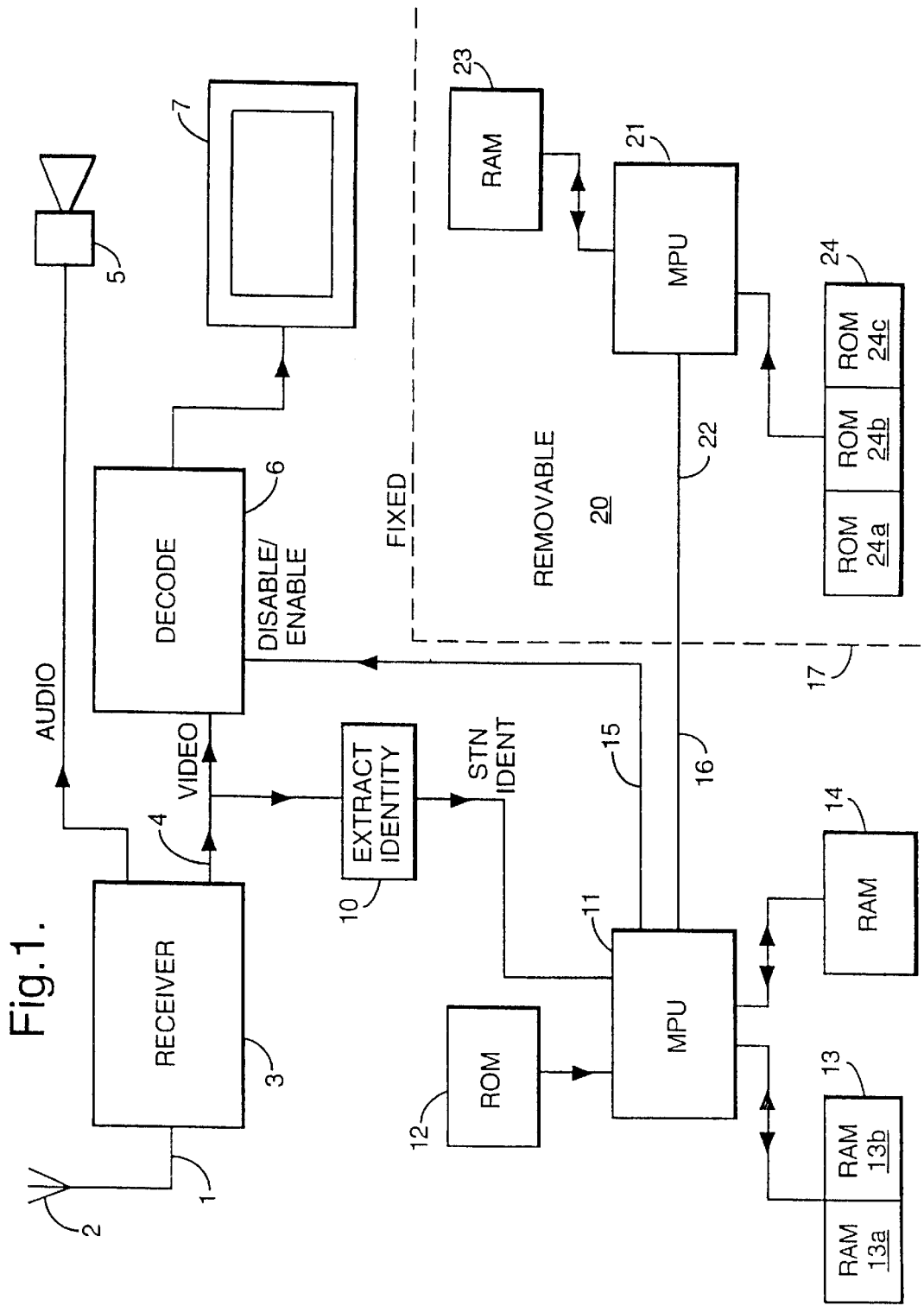
FIG. 1 is a block diagram of a television receiver according to one embodiment of the invention.

The television receiver shown in FIG. 1 has an input 1 for connection to an aerial 2, connected to a receiver 3 which demodulates received RF to produce a vision signal at 4 and an audio signal which is conducted to a loudspeaker 5. The video signal is assumed to be in scrambled form and thus passes via a decoder 6 to a display device 7.

The television signal contains provision for control information. In a conventional analogue signal this might consist of a digital transmission during the field blanking period, whilst in a digital multiplexed signal this would be contained in a portion of each multiplexed channel. Control bits are extracted by a unit 10 which, specifically, outputs a bit sequence corresponding to a station identifier. In principle this can be any bit sequence to distinguish one broadcast service from another, though a multi-level addressing scheme might be used if desired.

The purpose of the remaining items in FIG. 1 is to disable the reception of a service without the consent of the supplier of the receiver. It is envisaged that the receiver will be supplied on a subsidised basis, and that the receiver supplier will give this consent only in respect of services provided by broadcasters who contribute to this subsidy; but naturally these business arrangements are incidental to the technical features of the invention. In this description the receiver supplier is referred to as "the subsidiser".

Thus the receiver has a microprocessor 11 controlled by program instructions in a read-only memory 12 (which also contains a master public key), and connected also to a volatile read-write memory 13 which provides working ("scratchpad") storage 13a as well as locations 13b for containing a list of station identifiers corresponding to permitted and/or forbidden services, and a non-volatile read-write memory 14 for storing cryptographic keys. The regions 13a, b are identified for clarity: it is not expected that they should be physically distinct.

The microprocessor 11 also has an output 15 connected to the decoder 6 whereby the decoder may be enabled or disabled as appropriate. It also has an input/output port 16 connected via a plug-in connection 17 to a removable module 20. The module 20 contains a further microprocessor 21 with an input/output port 22 for communication with the microprocessor 11, read-write scratchpad memory 23 and a read only memory 24 containing program instructions 24a, a list of station identifiers 24b and a number of cryptographic keys 24c.

The processes to be performed by the microprocessors makes use of two well known cryptographic processes, the RSA public key algorithm (see PKCS#1:

RSA Encryption standard. RSA Laboratories Technical Note Version 1.5, November 1993) and the MD5 message digest algorithm (see RFC1321: The MD5 Message-Digest Algorithm, R. Rivest, April 1992). The program instructions in the memories 12 and 24 include routines for implementing these algorithms.

Figure 2:
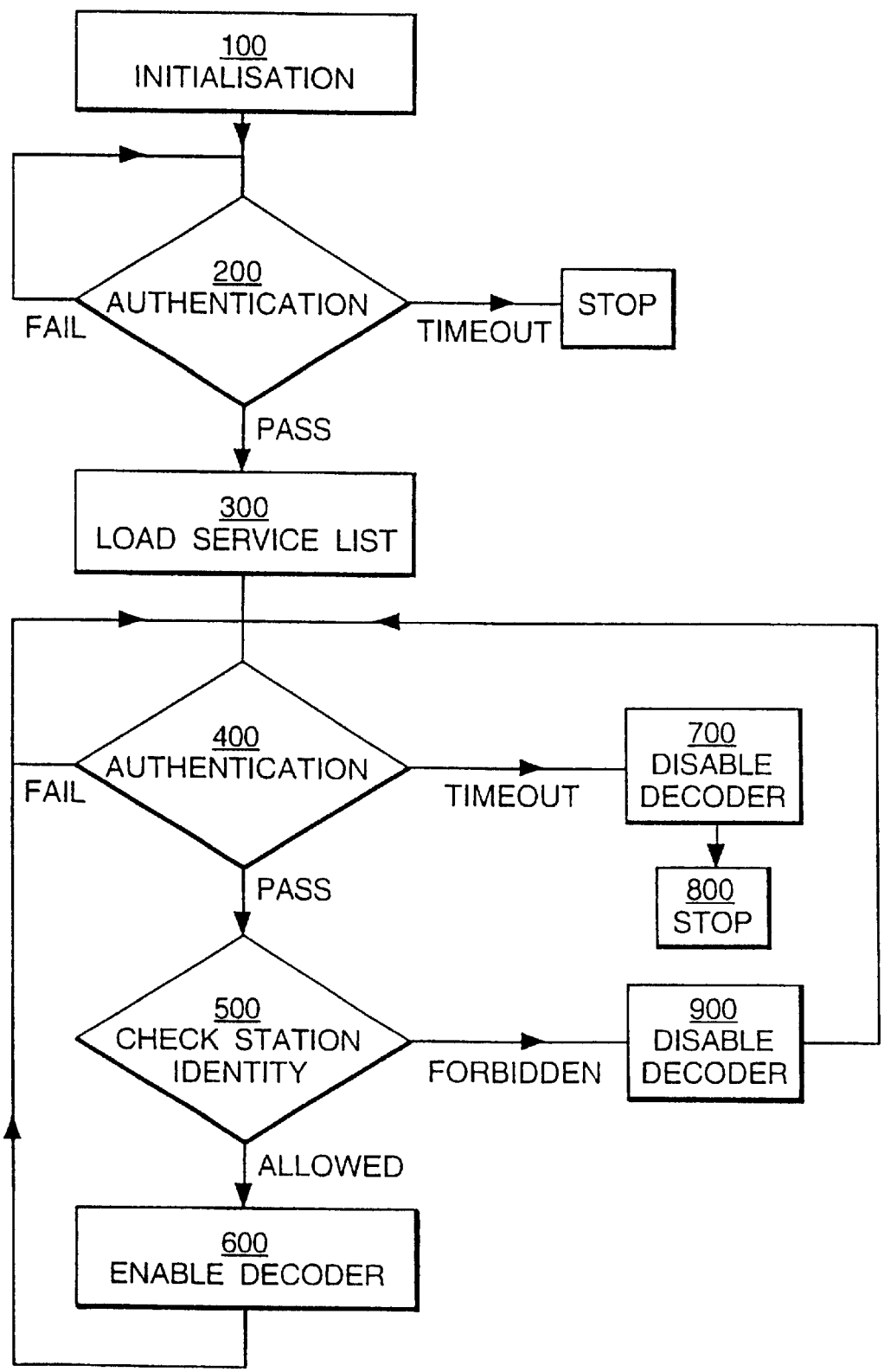

The processes performed by the microprocessors 11, 21 will firstly be outlined with reference to the flowchart of FIG. 2.

Upon manufacture the receiver is unable to receive any services (i.e. no 'enable' signal is transmitted to the decoder 6), though the capacity to process service information (e.g. as described in pr ETS 300 486: Specification for Service Information (SI) in Digital Video Broadcasting (DVB) applications) may be provided. Whilst the receiver contains the necessary programs and a subsidiser association master public key PbkM (assumed, for economy of receiver manufacture, to be common to all subsidisers), no information is contained in the read-write memories 13, 14. When a customer purchases a subsidised receiver he will also purchase a service package from the subsidiser, for which he will be supplied a conditional access module. The customer connects up the receiver and plugs in the CA module. The following process now takes place.

The first step 100 is an initialisation process which is a cryptographically authenticated exchange between the module 20 and the main part of the receiver (referred to as the host) in which further keys and information are transferred from the module to the host and stored in the memory 14.

Step 200 is an authentication exchange between the module and host which, if successful, is followed by the loading 300 from the module to the host (area 13b of memory 13) of a list of permitted and/or prohibited services. After this a further authentication step 400, identical to the authentication step 200, is performed and repeated at intervals during operation of the receiver—as indicated by the loopback from the end of step 600 to step 400.

Following successful authentication, the station identifier extracted at 10 (FIG. 1) is compared by the microprocessor 11 with the list stored in the memory 13b as shown at step 500. Assuming this results in a decision that reception is permitted, then (600) the microprocessor 11 sends an enable signal to the decoder 6 and the loop repeated.

In the event that the authentication step 400 fails, then that step may be repeated a fixed number of times; if success is not achieved then, as indicated by the "timeout" path in FIG. 2, the microprocessor 11 removes (step 700) any enable signal from the decoder 6 and the process is halted (800), whereupon the receiver can be reactivated only by switching off and on again to start afresh from step 100.

If the station identity check 500 indicates that the service is not permitted, the decoder is disabled at 900 and the authentication/station identity check cycle re-entered at 400.

Although the repetition of the authentication step and station identify check is shown as a continuous loop, it could of course be driven using timed interrupts.

It will be understood that steps 100, 200, 300, 400 are performed by means of a dialogue between the module and host, whilst steps 500, 600, 700, 800, 900 are performed by the host alone.

The initialisation step 100 will now be described in detail with reference to the flowchart of FIG. 3.

This step occurs when a module is first plugged into a new host, and the check part of the protocol is repeated every time that host does a cold start or a module is plugged in again. The module checks to see if the subsidiser public keys are present in the memory 14 (which they will not be on first start-up). To do this it sends (101) to the host a message identified by a key-check tag signal and a subsidiser identity code $Id_S$. Upon receipt (102) the host checks to see if the keys are present in the memory 14, and if (103) they are absent it replies with a key_check_reply with a "keys absent" status (104, 105). The module now receives this message at 106, 107, and sends 107 a message containing a signed certificate. The certificate contains a serial number Sn, the subsidiser operational public key ($Pbk_{SO}$), the subsidiser alternate public key ($Pbk_{SA}$), the subsidiser identifier ($Id_S$), and a signature. The signature consists of the MD5 digest of the certificate (excluding the signature), encrypted under the master private key ($Pvk_M$). This complete certificate may be generated off-line by a subsidiser association upon request from the subsidiser, and then embedded by him in all his modules. The master private key is preferably held securely by the association and is only ever used off-line to create subsidiser key certificates.

Upon receipt at 108 of the message, the host at 109 decrypts the received signature using the master public key ($Pbk_M$) stored in the memory 14 and compares it with the locally generated MD5 digest of the rest of the received certificate. If they match then (110) the host stores the subsidiser public keys $Pbk_{SO}$, $Pbk_{SA}$ and the subsidiser identifier $Id_S$ in the memory 13c. The initialisation process for the subsidiser is now complete.

In either case the process is repeated from 101, 102. If (on this second pass or on a later power-up), the keys a found at 103 to be present but (111) the code $Id_S$ stored in the memory 14 does not match that received from the module, the host replies with "subsidiser_id_mismatch" message (not shown) and then halts any further processing (112). If however a match is obtained the host replies (113, 114) with a "keys present" status and exits the authentication at 115. The module receives this status at 106, 116 and likewise continues 117 to the next process.

At any future time the module can send a new certificate, with the by signature again encrypted under the master private key. In this case after the host checks the certificate signature it also checks the certificate serial number and subsidiser identifier $Id_S$. If the subsidiser identifier matches, and if the serial number is greater than the serial number for the stored keys and not more than three greater, then the host accepts the new certificate, otherwise it rejects it. This allows subsidisers to change their own keys at will by supplying a new module. The presence of keys from one subsidiser (indicated by the Subsidiser Identifier in the store 14), means that no other subsidiser can then gain control access to that host.

If desired, the "keys present" test at 103 may be modified so that, when the host finds keys to be present it checks the stored key certificate signature for validity in the same manner as for a newly received certificate (i.e. as in step 109), and returns a "keys-present" status only if the check succeeds (in this case step 110 must also store the received signature). If the check fails then it would return "keys_absent" status so that the module attempts to reload the subsidiser key certificate.

In the authentication step 200 (FIGS. 4A and 4B), the host generates at 201 a random number, R. This can be constructed from features of the incoming multiplex, the time of day, and previous control behaviour by the user—key press values and particularly time intervals between key presses. The number of bits of R is to be determined, but it should be at least 32 bits for security, preferably 48 bits or more. For optimum security, it should not be generated by a pseudo-random process. It then computes (202) the MD5 digest, X, of R, that is, X=MD5(R) and encrypts X under the subsidiser operational public key $Pbk_{SO}$ and sends this (203) to the module, together with the subsidiser identifier $Id_S$. Upon receipt 204 of this message the module checks 205 whether the received value of $Id_S$ matches that stored in the module.

If it does not match, the module returns 206 a module_ack message with a status of Id_fail and terminates at 207. Otherwise it transmits 208 an Id_ok message and at 209 decrypts the challenge string using the subscriber operational private key ($Pbk_{SO}$), stored in the module, to recover X. The host at 210, 211 checks the status received from the module before proceeding. The flowchart assumes that the host halts operation (212) in the event of identity mismatch. Obviously retry could be allowed if desired.

If decryption is successful at 213, the module stores X in step 214 in the memory 23 and (215) sets status to auth_OK. Otherwise (216) status is set to auth_fail. The module then creates an authenticate reply message which contains a status field, an authenticate_interval field and an integrity check and transmits this at 217 to the host. The integrity check is the MD5 digest of X, the status, and the authenticate interval.

Upon receipt 218 the host checks the status at 219 and if satisfactory generates its own digest from X and the rest of the message and compares it with the received digest. If they match (at 220) then the authentication is deemed to be successful and the host will selectively enable services to be received. (On first start-up it will not yet know these, but these are signalled by the next part of the protocol). The value X is now known by both host and module, but cannot be determined by anyone observing the authentication exchange. It is used to validate all message exchanges until the next authentication, when X will change to a new value. It makes the data exchange protocol more efficient as only the MD5 algorithm is used in the process, which has considerably less computational overhead than the RSA algorithm, particularly with the expected key lengths required. If at 219 the host received auth-fail it means that there was a failure in the module decryption process. The host will immediately attempt another authentication from 201. This process can repeat for up to three authentication attempts. If all fail then the host closes the session. For clarity, the check for this is not shown in FIGS. 4A and 4B.

The authentication process is repeated at the intervals specified in seconds by the authentication value received from the module, e.g. by using it to control loop delay in FIG. 2 or by loading it into a timer for an interrupt driven arrangement.

In the service list load step 300 of FIG. 2, after the first successful authentication on switch-on the host requests a service selection list. This is returned by the module and the host stores it in the memory 13b and returns an acknowledgement. The list may consist of a list of permitted services (an Allow list) or a list of forbidden services (a Bar list). In this embodiment however it consists of a Bar list, followed by an Allow list. A service is uniquely identified by original network identifier, transport stream identifier and service identifier but the bar and allow lists can also contain entries only at the network or network/transport stream level, including all services under that level. As necessary the module can re-send this list when it changes.

Before a service list has been loaded into the host the host allows no services. Once the list has been loaded the host matches in step 500, FIG. 2 each service selected by the user against both the bar list and the allow list, either or both of which may be empty. The service may match no list entries, in which case it is allowed. It may match at the network, network/transport stream or completely down to service identifier. The most complete match is accepted. If it matches in the allow list the service is allowed. If it matches in the bar list then the service is barred. If it matches in both lists equally the service is allowed.

Figure 5:
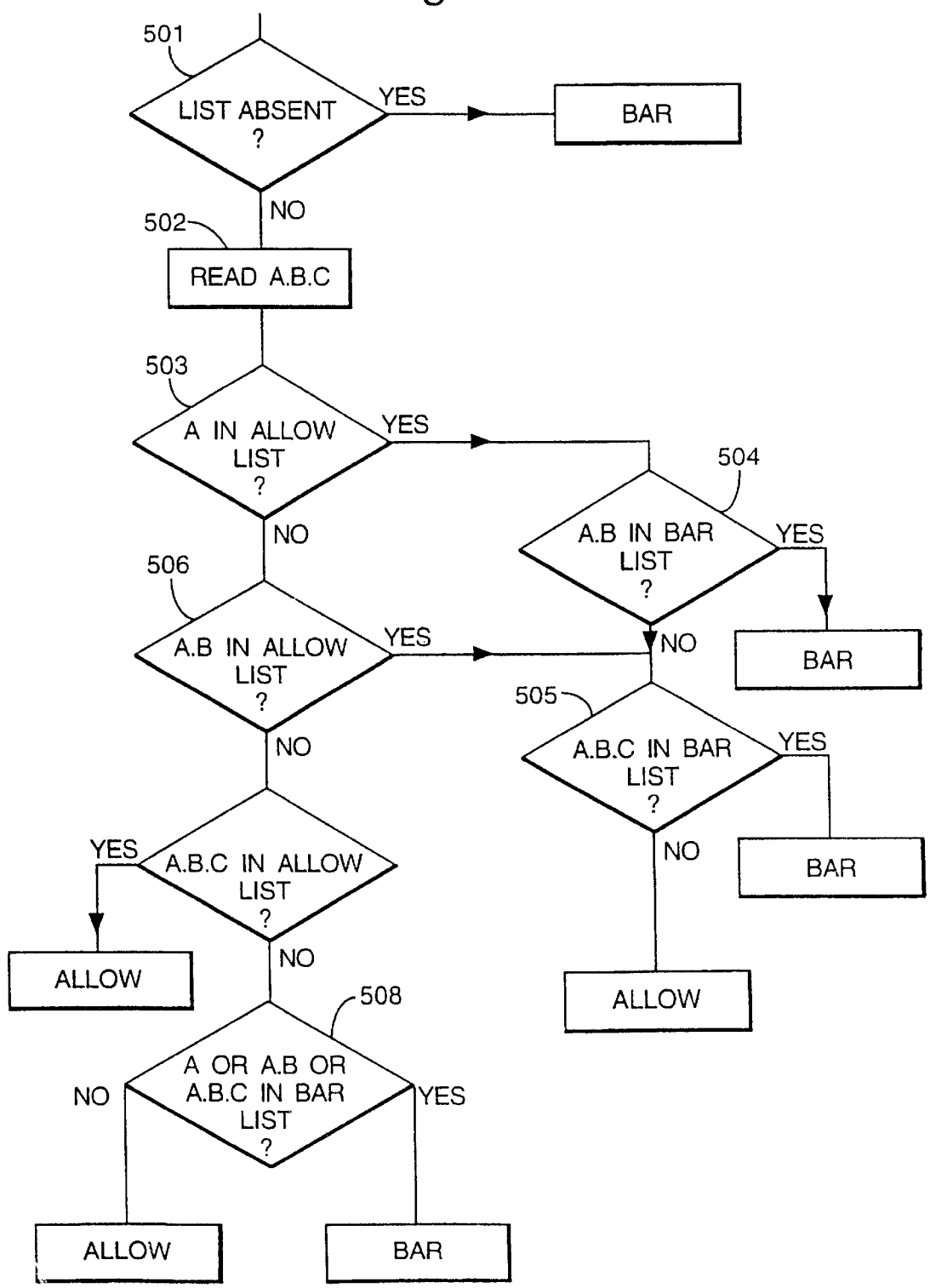

The comparison step 500 is shown in more detail in the flowchart of FIG. 5. It assumes as mentioned earlier—that the service identifier comprises three parts, identified here as A.B.C. (for network A, stream B, service C).

An allow list entry for A implies allowance of all services from network A unless overridden by a more specific entry e.g. A.B. in the Bar list. In more detail the following steps are shown.

501 check that the list is present; if not, allow no services.

502 Read the identifier A.B.C. from the unit 10.

503 If a general "allow" entry for network A is found in the allow list, then enable reception unless (504) a bar for network A stream B, or (505) a bar for network A, stream B, service C, is found in the bar list.

506 If A.B. is found in the allow list, then enable reception unless the specific service is (505) in the bar list.

507 If A.B.C (a complete match) is in the allow list, then enable reception.

508 If there is no corresponding entry in the allow list, then enable reception unless there is an entry (matching any level) in the bar list.

It may be desired to release the receiver from dependence on subsidy control. This might be performed, as shown by the chart in FIG. 6, by transmitting a coded message which is sent by means of a message included in the transmitted signal, with a release command, a sequence number, a time stamp and tolerance, and signed by the Subsidiser Alternate Private Key (which does not reside in the receiver. The module keeps a record of the sequence number of all release (or re-enable) messages sent to this module. If none have been sent then this stored value is zero. If the sequence number in the message is less than or equal to the highest previous sequence number the module ignores the message. If the sequence number is greater than the stored sequence number the module stores the new sequence number, generates a digest of the message with the current value of X and sends the message with digest appended to the host. The host checks the digest in the usual way, and then decrypts the signature with the Subsidiser Alternate Public Key and checks the result against a locally generated digest of the rest of the message to verify it. If it verifies, and the time stamp is within some defined maximum difference from current time, the release command is effected and the host becomes released. Release is implemented by storing a release flag in non-volatile memory, this having the effect of permanently enabling the decoder 6.

The release message is not acknowledged—the module assumes that release takes place. The release operation is reversible by the same mechanism, if necessary.

By doing it this way all the management of the subsidy control mechanism is done via the module, rather than the host having to deal with off-air control messages from the multiplex.

It will be understood that the processes set out in the charts of FIGS. 2 to 6 are implemented as programs stored in the memories 12, 24.

The use of cryptographic signatures, though not essential, is preferred for a secure system, though other encryption and digest algorithms than those specified may be used. If the RSA algorithm is used, then the use of block types 01 and 02 described in sections 8 and 9 of the above-mentioned Technical note of 1993.

The following abbreviations are used in the flowcharts.

+sign indicates concatenation

Rx( ) indicates received version of transmitted quantity $Id_S$ Subsidiser Identifier $Pbk_{SO}$ Subsidiser Operational Public Key $Pvk_{SO}$ Subsidiser Operational Private Key $Pbk_{SA}$ Subsidiser Alternate Public Key $Pvk_{SA}$ Subsidiser Alternate Private Key $Pbk_M$ Master Public Key $Pvk_M$ Master Private Key

What is claimed is:

1. Apparatus for receiving broadcast transmissions, which transmissions contain identifiers identifying the origin of the transmission, the apparatus including:

a store for storing data identifying transmissions which the apparatus is or is not permitted to receive;

means for loading the store with such data; and means for comparing received identifiers with the contents of the store and to enable or disable reception in dependence on the result of the comparison;

wherein the apparatus has a fixed part and a removable part;

wherein the removable part contains a further store containing the said data;

the loading means being operable to transfer the contents of the further store into the first-mentioned store; and wherein each of the fixed and removable parts has means storing a verification number (X) and the loading means is operable to perform the transfer only after a verification step indicating that the verification numbers tally.

2. Apparatus as in claim 1 in which the stored data includes a list of permitted transmissions and the comparison means is operable to allow reception only of transmissions containing identifiers matching the list.

3. Apparatus as in claim 1 in which the stored data includes a list of transmissions not permitted and the comparison means is operable to prevent reception of transmissions containing identifiers matching the list.

4. Apparatus as in claim 1 in which:

each identifier has a generic part identifying a class of services and a specific part identifying a service within that class, the stored data includes a first list containing entries each including either of a generic part of an identifier or of a complete identifier, identifying permitted classes and/or services, and a second list containing such entries identifying prohibited classes and/or services, and the comprising mean is operable to compare receive identifier with the first and second lists.

5. Apparatus as in claim 1 operable to perform the said verification repeatedly during operation of the apparatus.

6. Apparatus as in claim 1 in which one of said parts is arranged to generate the verification number and send it in encrypted form to the other of said parts where it is decrypted.

7. Apparatus as in claim 6 in which the removable part is arranged to transmit to the fixed part of key (Pbkso) for use in transfer of the verification number.

8. Apparatus as in claim 7 operable to perform an initialization process in which:

the removable part sends to the fixed part the key (Pbkso) for use in transfer of the verification number and an encryption certificate, and the fixed part stores the key only after successful verification of the certificate by reference to a further key (Pbkm) permanently stored in the fixed part.

9. A method for receiving broadcast transmissions, which transmissions contain identifiers identifying the origin of the transmission, the method including:

storing data in a store identifying transmissions which the apparatus is or is not permitted to receive;

loading the store with such data; and comparing received identifiers with the contents of the store and to enable or disable reception in dependence on the result of the comparison;

wherein a removable and separable part contains a further store containing the said data;

transferring the contents of the further store into the first-mentioned store; and wherein each of fixed and removable parts has stores a verification number (X) and the transfer is performed only after a verification step indicating that the verification numbers tally.

10. A method as in claim 9 in which the stored data includes a list of permitted transmissions and the comparing step is operable to allow reception only of transmissions containing identifiers matching the list.

11. A method as in claim 9 in which the stored data includes a list of transmissions not permitted and the comparing step is operable to prevent reception of transmissions containing identifiers matching the list.

12. A method as in claim 9 in which:

each identifier has a generic part identifying a class of services and a specific part identifying a service within that class, the stored data includes a first list containing entries each including either of a generic part of an identifier or of a complete identifier, identifying permitted classes and/or services, and a second list containing such entries identifying prohibited classes and/or services, and the comparing step is operable to compare receive identifiers with the first and second lists.

13. A method as in claim 9 operable to perform the said verification repeatedly during operation.

14. A method as in claim 9 in which one of said parts is arranged to generate the verification number and send it in encrypted form to the other of said parts where is decrypted.

15. A method as in claim 14 in which the removable part is arranged to transmit to the fixed part a key (Pbkso) for use in transfer of the verification number.

16. A method as in claim 15 operable to perform an initialization process in which:

the removable part sends to the fixed part the key (Pbkso) for use in transfer of the verification number and an encryption certificate, and the fixed part stores the key only after successful verification of the certificate by reference to a further key (Pbkm) permanently stored in the fixed part.

* * * * *